United States Patent

[11] 3,610,821

| [72] | Inventor | Jean Raymond Narbaits-Jaureguy<br>1. rue Louis Mercier, Malakoff, (Seine), France |
|---|---|---|
| [21] | Appl. No. | 465,796 |
| [22] | Filed | June 21, 1965 |
| [45] | Patented | Oct. 5, 1971 |
| [32] | Priority | June 23, 1964 |
| [33] | | France |
| [31] | | 979,284 |

[54] NAVIGATING AND LANDING DEVICE FOR AIRCRAFT
3 Claims, 6 Drawing Figs.

[52] U.S. Cl. .................................................... 178/6.8,
244/75 R, 356/1
[51] Int. Cl. ..................................................... H04n 1/00
[50] Field of Search ........................................... 88/1 U, 1 T,
2.2, 2.3; 343/6 TU; 356/1; 178/6.8

[56] References Cited
UNITED STATES PATENTS

| 2,225,046 | 12/1940 | Hunter ......................... | 88/1 U |
| 2,280,126 | 4/1942 | Metcalf ....................... | 88/1 U |
| 3,053,932 | 9/1962 | Worst .......................... | 343/6 TU |
| 3,076,961 | 2/1963 | Bibbero ...................... | 343/6 TU |
| 2,017,692 | 10/1935 | Gaty ........................... | 88/1 |
| 2,379,496 | 7/1945 | Saunier ....................... | 88/1 U |
| 2,719,470 | 10/1955 | Jensen ......................... | 88/1 T |
| 2,817,994 | 12/1957 | Ehrenhoft et al. .......... | 88/1 T |
| 3,293,438 | 12/1966 | Davis .......................... | 250/199 |

*Primary Examiner*—Rodney D. Bennett, Jr.
*Assistant Examiner*—Daniel C. Kaufman
*Attorney*—Watson, Cole, Grindle & Watson ABSTRACT: A device projects two beams of light which are reflected and detected by a television camera; the camera has image-stabilizing means; the screen of a monitor shows the pilot of an aircraft the area on which he is to land.

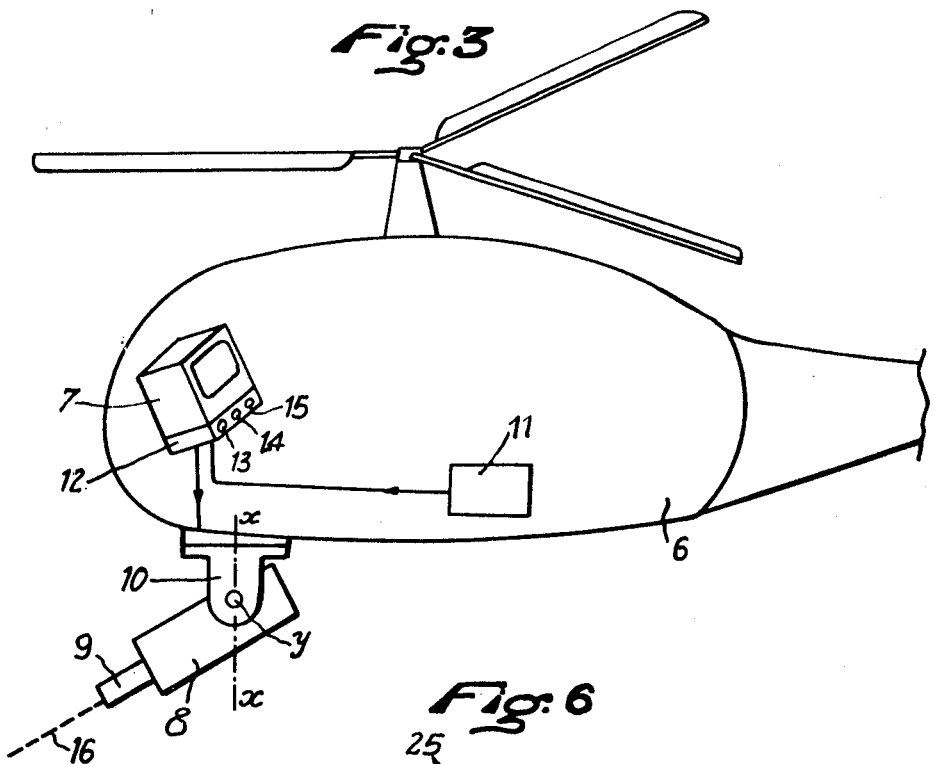

NAVIGATING AND LANDING DEVICE FOR AIRCRAFT

ABSTRACT OF THE DISCLOSURE

A device projects two beams of light which are reflected and detected by a television camera; the camera has image-stabilizing means; the screen of a monitor shows the pilot of an aircraft the area on which he is to land.

The present invention relates to a combination of piloting means forming a unit by which it is possible for the pilot of an aerodyne to navigate and to land his craft correctly during the night on a landing ground selected by himself.

The invention aims principally at making any recourse to piloting means located on the ground unnecessary, and at making it possible to operate without indiscreet lighting.

Other aims and characteristics of the navigating and landing device will be seen from the description which follows.

The device comprises in combination an ultrasensitive television camera carried by the aircraft; means for selecting and stabilizing the observation axis of the camera in a direction which is fixed in relation to the ground; a video monitor disposed in front of the pilot of the aircraft; means for assessing the distances of objects seen on the ground by means of the camera.

The preferred form of telemeter comprises two light projectors, preferably with infrared lighting, projecting on the ground light beams which are linear and parallel, orientated in the observation axis of the camera by the stabilization means of the latter; it further comprises the said camera and the said video monitor and a scale on the screen of the video monitor.

The invention will now be described with reference to the attached drawings, which show embodiments of the device of the invention by way of example only, and in no restrictive sense.

FIG. 1 is a diagrammatic view from the front of an aircraft in flight, here a helicopter.

FIG. 2 is a diagrammatic lateral view of the same aircraft in flight.

FIG. 3 is a lateral diagrammatic view showing the elements constituting the landing device.

FIG. 6 shows the pilots display screen of the present invention. The device in accordance with the invention has the feature that it puts into operation conjointly the following means:

Figure 4:
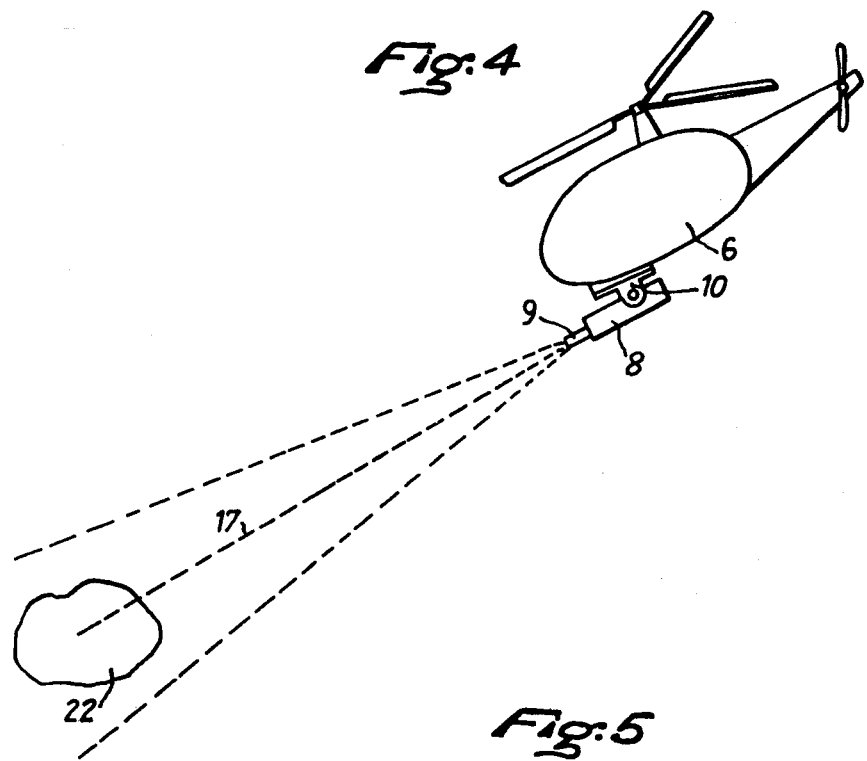
FIG. 4 shows diagrammatically the aircraft in the flight, and its landing area.

1. An ultrasensitive television camera which gives video signals of the landscape, illuminated by the residual light which is present even on the blackest night.
2. Gyroscopic stabilizing equipment defining perpendicular reference axes, of fixed direction in relation to the ground. The said equipment is known per se, and it makes it possible for the pilot to establish and transmit a stabilized observation line to the camera, the orientation of said observation line being determined in relation to axes of reference. Incidentally, it is noted that the stabilization, if it bears directly on the camera in its unit eliminates the blurring and the loss of definition of the image which are the cause of vibrations of the aircraft.
3. A video monitor, i.e. a television screen, connected by cable to the camera, disposed in front of the pilot who thus observes the image transmitted by the camera.
4. An optical telemeter, the nature of which is specified below.

The expressions "angle of inclination" or "inclination" and "angles of slope" or "slope" used below are defined as follows in relation to the aircraft as seen in FIGS. 2 and 3;

The straight lines 2 and 5 are located in a horizontal plane of the craft, when said craft is in horizontal flight; the straight line 2 is in the plane of symmetry of the aircraft and the straight line 5 is perpendicular to the straight line 2. The "slope," as seen in FIG. 2, is the angle 1 between 2 and the horizontal plane 3. The "inclination," as seem in FIG. 1, is the angle 4 of the line 5 and of the horizontal plane 3.

In the aircraft as seen in FIG. 3, the pilot has in front of his eyes the video monitor 7. In front of the aircraft a camera 8 with a lens 9 of variable focus, which can be controlled by the pilot, is fixed to the support member 10. In a first solution, the support 10 is orientatable about an axis $x—x$, substantially vertical when the aircraft is in horizontal flight. The said support member carries the camera by means of the horizontal bearings of the axle $y$. The camera is accordingly orientated by the support 10 which receives its orders from the gyroscopic stabilizing equipment 11. In another known solution, the camera is rigidly fixed to the aircraft, and a mirror or a light-deflecting prism is disposed in front of the lens which receives the desired movements from the stabilizer, so as to keep an observation line of fixed orientation in relation to the ground.

The gyroscopic stabilizer is itself controlled by control dials 13, 14, 15 disposed for example on the box 12, under the video monitor, said dials orientatably posting the values of slope and course in relation to stabilized axes, to be given to the observation line 17 of the camera.

During navigation, the pilot can observe a part of the landscape, and as the observation axis is known, can localize his position and reset his navigating instruments by referring to characteristic features of the terrain.

When the pilot has reached the zone where he has to land, he locates his landing ground 22 by means of the camera, as in FIG. 2, then, taking into account his position and the characteristics of his craft, he posts on the box 12 for controlling the position of the camera the values of inclination of the aircraft, of the course and of the slope, of the line of descent suitable for the landing which he has to carry out.

If the pilot, in making his landing approach, controls his machine in such a way as to keep in the center of the video monitor the image of the landing area selected, he will land by following substantially the line of descent 17.

By actuating the lens by television control, he will be able to give to the landscape observed or to the landing area the most suitable dimensions for observation and accordingly for the satisfactory carrying out of his operation.

To operate with surety, it is advisable to assess the distance from the craft to the landing strip 22. This can be done in an approximation by comparing the images of known objects, trees, houses, and so on, on the video monitor, which carries, as is known, scales as a function of focal distance from the lens of the camera.

The distance may be difficult to assess in the case of a terrain bare of objects which could be used for assessing dimensions.

Figure 5:
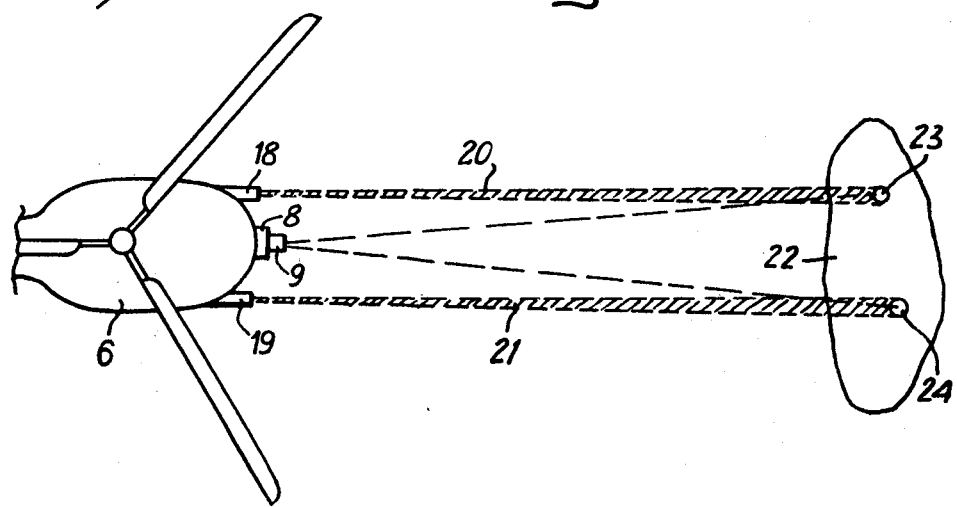
FIG. 5 is a top view of the aircraft in the course of landing, with a diagrammatic representation of its optical telemeter.

In all cases it is possible to make use of an optical telemeter in accordance with the invention, as in FIG. 5. The said telemeter is comprised of two projectors, preferably with infrared light emission, 18 and 19, disposed in front of the aircraft. The said projectors emit onto the ground infrared light beams that are linear and parallel to each other, 20 and 21, and are controlled as regards slope and direction by the gyroscopic stabilizing equipment, in accordance with the observation line of the camera. The two spots 23 and 24, produced on the ground by the infrared light beams are observed at 25 on the video monitor, as can be seen in FIG. 6, and the distance of the said spots from the aircraft can be read directly on a scale on the video monitor, graduated as a function of the spacing of the projectors 18 and 19 and of the focal distance from the lens of the camera.

The pilot can accordingly operate with precision up to the moment of contact with the ground.

Fog, mist clouds produce diffraction and diffusion phenomena, the inconvenience of which can be considerably diminished by using coherent light projectors, such as lasers, gallium arsenide diodes and so on.

I claim:

1. In a navigating and landing device for night flight controlled by television, for an aerodyne, the improvement comprising in combination a television camera carried by the aerodyne; means for selecting and stabilizing the observation axis of the camera in a direction which is fixed in relation to the ground; a video monitor disposed in front of the pilot of the craft; means carried by the aerodyne for projecting on the ground two light beams both within the scope of the camera, the images of said light beams on the monitor indicating the distances of objects seen on the ground by means of the camera.

2. In a device as in claim 1, the improvement comprising a graduated scale on the screen of the video monitor.

3. In a device as in claim 1, the improvement comprising the fact that said two light beams are linear and parallel to each other, and oriented in accordance with the observation axis of the camera by the stabilizing means of the latter, said optical telemeter further including a scale on the screen of the said video monitor.